United States Patent
Ploof et al.

(10) Patent No.: US 9,204,661 B2
(45) Date of Patent: Dec. 8, 2015

(54) RACK OVEN WITH DIRECT FIRE HEATING SYSTEM

(71) Applicants: Michael J. Ploof, Pupyallup, WA (US); Joseph V. Nelson, Orting, WA (US)

(72) Inventors: Michael J. Ploof, Pupyallup, WA (US); Joseph V. Nelson, Orting, WA (US)

(73) Assignee: Illionois Tool Works Inc., Glenview, IL (US)

( * ) Notice: Subject to any disclaimer, the term of this patent is extended or adjusted under 35 U.S.C. 154(b) by 0 days.

(21) Appl. No.: 14/064,861

(22) Filed: Oct. 28, 2013

(65) Prior Publication Data

US 2014/0205728 A1 Jul. 24, 2014

Related U.S. Application Data

(60) Provisional application No. 61/754,271, filed on Jan. 18, 2013.

(51) Int. Cl.
| | | |
|---|---|---|
| *A21B 1/28* | (2006.01) | |
| *A23L 1/01* | (2006.01) | |
| *A47J 37/04* | (2006.01) | |
| *A21B 1/26* | (2006.01) | |
| *A21B 1/33* | (2006.01) | |
| *A21B 1/44* | (2006.01) | |

(52) U.S. Cl.
CPC ............... *A23L 1/0128* (2013.01); *A21B 1/26* (2013.01); *A21B 1/28* (2013.01); *A21B 1/33* (2013.01); *A21B 1/44* (2013.01); *A23L 1/0135* (2013.01); *A47J 37/043* (2013.01)

(58) Field of Classification Search
CPC .............. A21B 1/26; A21B 1/28; A21B 1/33; A21B 1/44; A23L 1/0135; A47J 37/043; A47J 37/0647; A47J 37/0682; A47J 37/0713; A47J 37/0727; A47J 37/074; A47J 37/0754
USPC ............................ 426/523, 505; 99/331–333, 99/326–329 RT, 443 R, 473–481; 126/39 R, 126/41 A, 39 E, 15 A, 21 A
See application file for complete search history.

(56) References Cited

U.S. PATENT DOCUMENTS

| | | | | | |
|---|---|---|---|---|---|
| 3,040,734 | A | * | 6/1962 | Field et al. ................ | 126/307 R |
| 3,312,269 | A | * | 4/1967 | Johnson ........................ | 431/328 |
| 3,384,068 | A | * | 5/1968 | Perry et al. .................. | 126/21 A |
| 3,587,557 | A | * | 6/1971 | Henderson ................... | 126/21 A |
| 3,605,717 | A | * | 9/1971 | Sauer .......................... | 126/21 A |
| 3,626,922 | A | * | 12/1971 | Borge ........................ | 126/21 A |
| 3,658,047 | A | * | 4/1972 | Happel ...................... | 126/21 A |
| 3,682,156 | A | * | 8/1972 | Perl ............................. | 126/21 A |
| 3,954,053 | A | * | 5/1976 | Johansson et al. .......... | 99/443 R |
| 4,032,289 | A | * | 6/1977 | Johnson et al. .............. | 432/200 |
| 4,109,636 | A | * | 8/1978 | Burge ......................... | 126/21 A |
| 4,510,854 | A | | 4/1985 | Robertson | |

(Continued)

*Primary Examiner* — Drew Becker
(74) *Attorney, Agent, or Firm* — Thompson Hine LLP

(57) ABSTRACT

A rack oven includes a cooking chamber accessible via a door and a rack rotating mechanism within the cooking chamber. A combustion chamber is separated from the cooking chamber by at least one wall, the combustion chamber including a burner. A circulation flow path is provided for delivering gases from the cooking chamber into the heating chamber and past the burner in the combustion zone to pick-up heat and combustion gases for delivery back to the cooking chamber to heat the cooking chamber. A flame protector located in the heating chamber in the circulation flow path upstream of the burner prevents gases moving past the burner from extinguishing the burner.

13 Claims, 2 Drawing Sheets

(56) References Cited

U.S. PATENT DOCUMENTS

| | | | |
|---|---|---|---|
| 4,574,689 A * | 3/1986 | Robertson | 99/337 |
| 4,722,683 A * | 2/1988 | Royer | 432/152 |
| 4,796,600 A | 1/1989 | Hurley et al. | |
| 4,823,766 A * | 4/1989 | Violi | 126/20 |
| 4,960,100 A * | 10/1990 | Pellicane | 126/21 A |
| 4,979,436 A * | 12/1990 | McGowan | 99/340 |
| 5,016,606 A * | 5/1991 | Himmel et al. | 126/21 A |
| 5,129,384 A * | 7/1992 | Parks | 126/21 A |
| 5,211,106 A * | 5/1993 | Lucke | 99/441 |
| 5,394,791 A | 3/1995 | Vallee | |
| D363,639 S | 10/1995 | Vallee | |
| 5,533,444 A * | 7/1996 | Parks | 99/476 |
| D374,377 S | 10/1996 | Vallee | |
| 5,562,022 A | 10/1996 | Schmid et al. | |
| 5,598,769 A | 2/1997 | Luebke et al. | |
| 5,615,603 A * | 4/1997 | Polin | 99/331 |
| 5,617,839 A | 4/1997 | Jennings et al. | |
| 5,636,622 A * | 6/1997 | Amondarain et al. | 126/20 |
| 5,653,164 A | 8/1997 | Vallee | |
| 5,704,278 A * | 1/1998 | Cross | 99/427 |
| 5,813,393 A * | 9/1998 | Persson et al. | 126/21 A |
| 5,813,711 A | 9/1998 | Sauvagnat | |
| 6,038,964 A * | 3/2000 | Sikes | 99/340 |
| D425,749 S | 5/2000 | Homayoun et al. | |
| 6,371,104 B1 * | 4/2002 | Voohris | 126/21 A |
| 6,837,234 B2 | 1/2005 | Rabas et al. | |
| 6,854,457 B2 | 2/2005 | Rabas et al. | |
| 6,883,513 B2 | 4/2005 | Bock | |
| 7,094,995 B2 | 8/2006 | Mills | |
| 7,297,904 B2 | 11/2007 | Paller | |
| 7,301,130 B2 | 11/2007 | Mills | |
| 7,353,821 B2 | 4/2008 | Saksena | |
| 7,527,051 B2 | 5/2009 | Schmitz | |
| 7,547,864 B2 | 6/2009 | Beausse | |
| 7,634,992 B2 | 12/2009 | Bujeau et al. | |
| 7,875,834 B2 | 1/2011 | Bujeau et al. | |
| 8,080,766 B2 | 12/2011 | Frock et al. | |
| 8,138,459 B2 | 3/2012 | Beausse | |
| 8,151,697 B2 | 4/2012 | Valentine et al. | |
| 8,191,465 B2 | 6/2012 | Sager et al. | |
| 8,201,552 B2 | 6/2012 | Ploof et al. | |
| 8,291,896 B1 | 10/2012 | Gonnella et al. | |
| 8,354,620 B2 | 1/2013 | Frock et al. | |
| 8,375,848 B2 | 2/2013 | Valentine et al. | |
| 8,517,006 B2 | 8/2013 | Frock et al. | |
| 2005/0051149 A1* | 3/2005 | Bock | 126/19 R |
| 2007/0131234 A1* | 6/2007 | Moore | 131/296 |

* cited by examiner

RACK OVEN WITH DIRECT FIRE HEATING SYSTEM

CROSS-REFERENCES

This application claims the benefit of U.S. Provisional Application Ser. No. 61/754,271, filed Jan. 18, 2013, which is incorporated herein by reference.

TECHNICAL FIELD

This application relates generally to ovens used in commercial cooking environments such as bakeries, restaurants and retail food stores and, more specifically, to a rack oven that utilizes direct fire heating.

BACKGROUND

Commercial cooking ovens (e.g., such as rack ovens) commonly burn gaseous fuel and pass the combustion exhaust gases through heat exchange tubes of a heat exchanger and then up a stack and through an exhaust system to be delivered external to the oven. Cooking air is recirculated from the cooking chamber past the heat exchange tubes to pick-up heat, and the heated cooking air is then delivered back to the cooking chamber. Some level of efficiency is generally lost in the heat exchange between the combustion gases and the cooking air.

It would be desirable to provide an oven that makes direct use of the combustion exhaust gases so as to reduce the wasted heat and energy during oven operation.

SUMMARY

In one aspect, a method of cooking food product in a chamber of a rack oven includes: rotating a rack structure with food product thereon in a cooking chamber of the oven; delivering gaseous fuel and oxygen to a burner in a combustion zone; moving gases along a circulation flow path from the cooking chamber past the burner to pick-up heat and combustion gases and then back to the cooking chamber to heat the cooking chamber and food product therein; and utilizing a flame protector in the circulation flow path upstream of the burner such that gases moving past the burner do not extinguish the burner.

In one implementation the method includes exhausting gases from the oven via an outlet opening located in a lower portion of the cooking chamber.

In one implementation of the method, a volume of the cooking chamber is between about 10 and about 15 ft3; the burner operates with a BTU output of between about 35 thousand and about 45 thousand BTUs during cooking; and gases are circulated at a rate of between about 600 and about 950 CFM during cooking.

In another implementation of the method, a volume of the cooking chamber is between about 35 and about 45 ft3; the burner operates with a BTU output of between about 85 thousand and about 105 thousand BTUs during cooking; and gases are circulated at a rate of between about 600 and about 950 CFM during cooking.

In another implementation of the method, a volume of the cooking chamber is between about 60 and about 70 ft3; the burner operates with a BTU output of between about 165 thousand and about 195 thousand BTUs during cooking; and gases are circulated at a rate of between about 2000 and about 2500 CFM during cooking.

In another implementation of the method, a volume of the cooking chamber is between about 100 and about 120 ft3; the burner operates with a BTU output of between about 250 thousand and about 370 thousand BTUs during cooking; and gases are circulated at a rate of between about 2500 and about 3000 CFM during cooking.

In one implementation of the method of any of the six preceding paragraphs, the combustion zone is positioned alongside the cooking chamber.

In one implementation of the method of any of the seven preceding paragraphs, the flame protector includes a perforated structure.

In one implementation of the method of any of the eight preceding paragraphs, the flame protector includes an expanded metal cylinder within which the burner is positioned.

In one implementation of the method of any of the nine preceding paragraphs, the burner includes a pre-mixer in combination with a mesh structure.

In one implementation of the method of any of the ten preceding paragraphs, in the exhausting step primarily cooler gases from within the cooking chamber are exhausted due to the location of the outlet opening.

In another aspect, a rack oven includes a cooking chamber accessible via a door opening, and a rack rotating mechanism within the cooking chamber. A combustion chamber is separated from the cooking chamber by at least one wall, the combustion chamber including a burner. A circulation flow path is provided for delivering gases from the cooking chamber into the combustion chamber and past the burner to pick-up heat and combustion gases for delivery back to the cooking chamber to heat the cooking chamber. A flame protector is located in the combustion chamber in the circulation flow path upstream of the burner for preventing gases moving past the burner from extinguishing the burner.

In on implementation of the rack oven, the oven further includes an outlet opening located in a lower portion of the cooking chamber for exhausting gases to an exhaust stack.

In one implementation of the rack oven of either of the preceding paragraphs, the combustion chamber is positioned alongside the cooking chamber.

In one implementation of the rack oven of any of the three preceding paragraphs, the flame protector comprises a perforated structure.

In one implementation of the rack oven of any of the four preceding paragraphs, the flame protector comprises an expanded metal cylinder within which the burner is positioned.

In one implementation of the rack oven of any of the five preceding paragraphs, the burner comprises a pre-mixer in combination with a mesh structure.

Several size variations of the rack oven of any of the six preceding paragraphs are specifically contemplated. For example:

In one size variation a volume of the cooking chamber is between about 10 and about 15 ft3; the burner is configured to operate with a BTU output of between about 35 thousand and about 45 thousand BTUs during cooking; and a blower is configured to circulate gases at a rate of between about 600 and about 950 CFM during cooking.

In another size variation a volume of the cooking chamber is between about 35 and about 45 ft3; the burner is configured to operate with a BTU output of between about 85 thousand and about 105 thousand BTUs during cooking; and a blower is configured to circulate gases at a rate of between about 600 and about 950 CFM during cooking.

In another size variation a volume of the cooking chamber is between about 60 and about 70 ft3; the burner is configured to operate with a BTU output of between about 165 thousand and about 195 thousand BTUs during cooking; and a blower is configured to circulate gases at a rate of between about 2000 and about 2500 CFM during cooking.

The details of one or more embodiments are set forth in the accompanying drawings and the description below. Other features, objects, and advantages will be apparent from the description and drawings, and from the claims.

DETAILED DESCRIPTION

Figure 1:
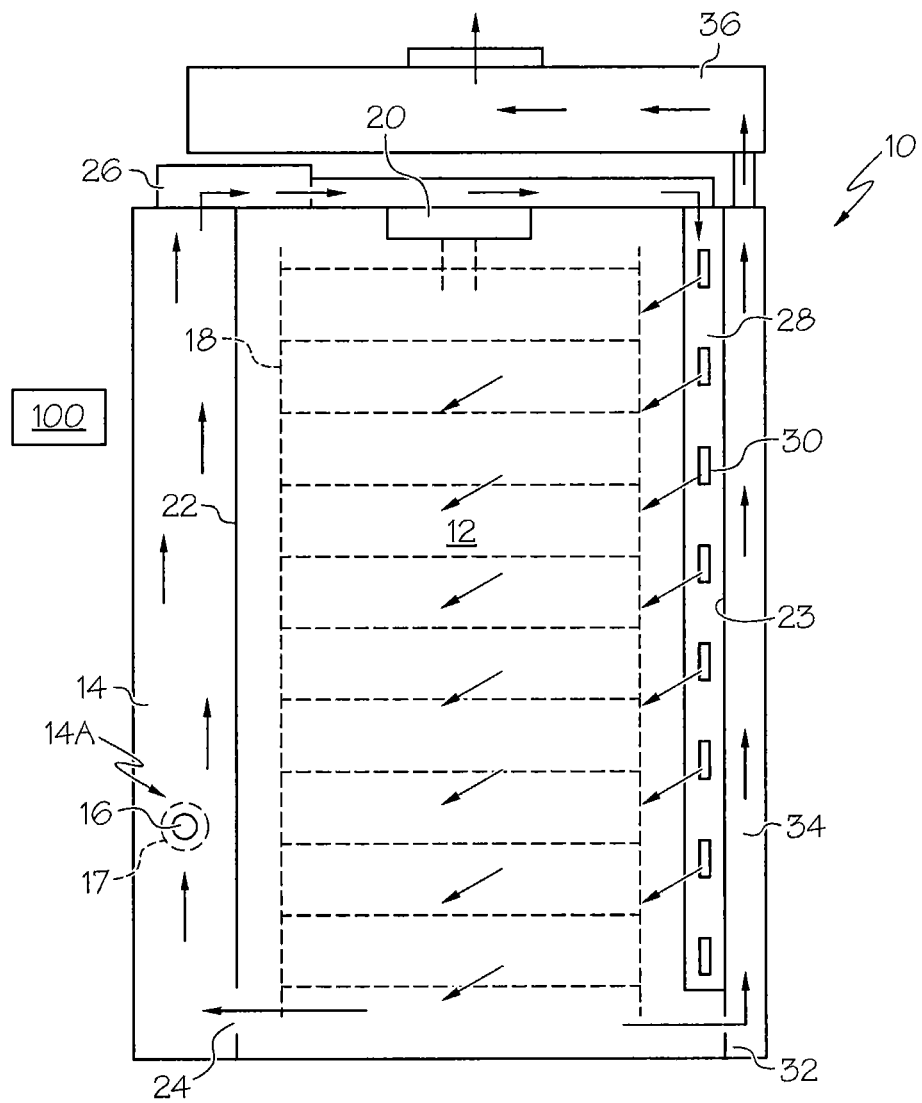
FIG. 1 a schematic elevation view of an oven.
Figure 2:
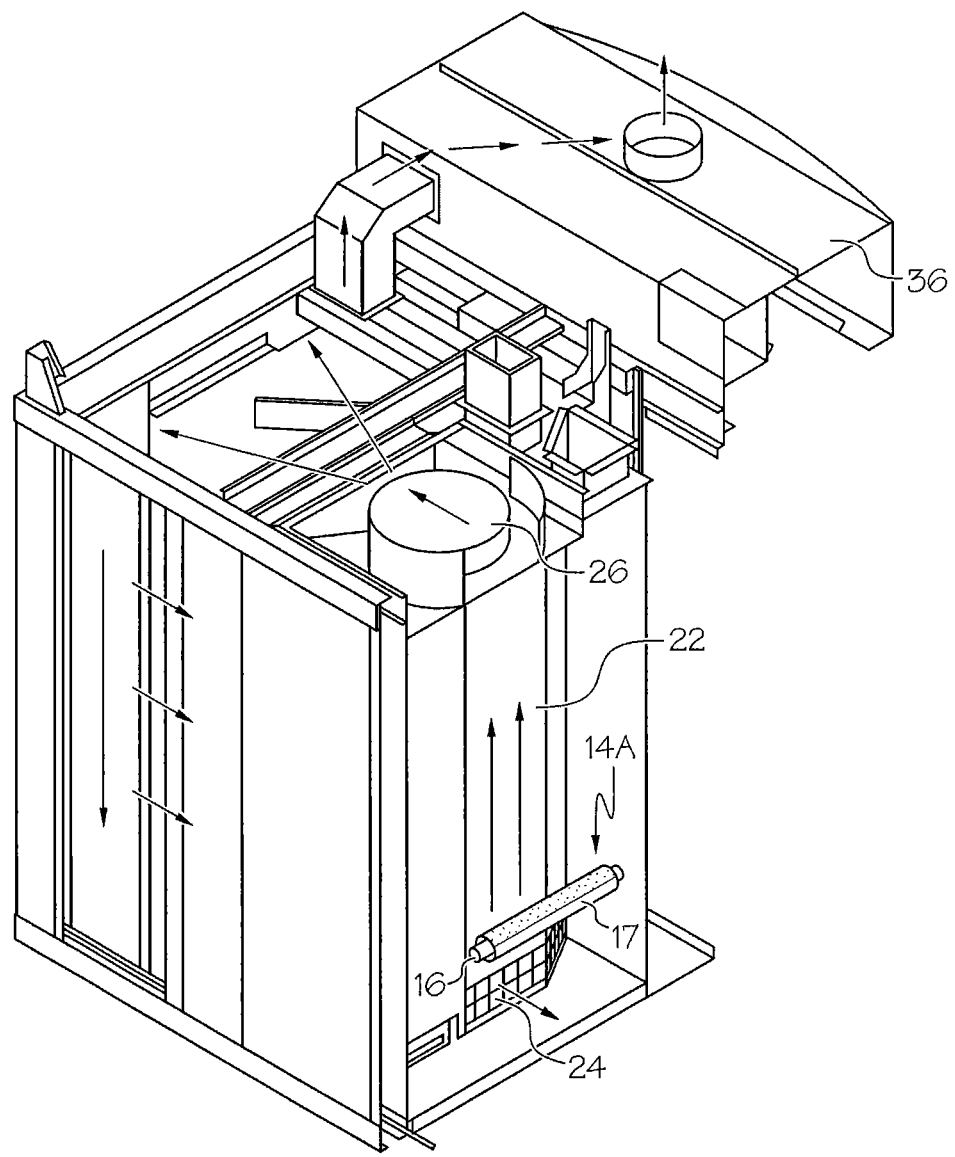
FIG. 2 is a partial perspective view of the oven with side housing broken away to expose the combustion chamber and top housing broken away to expose an upper portion of the recirculation flow path.

Referring to FIG. 1, a rack oven 10 includes a cooking chamber 12 and a combustion chamber 14 alongside the cooking chamber. Rack ovens come in a variety of sizes, such as micro (e.g., cooking chamber volume of less than 20 ft$^3$, such as between 10 and 15 ft$^3$), mini (e.g., cooking chamber volume of greater than 30 ft$^3$ but less than 50 ft$^3$, such as between 35 and 45 ft$^3$), single (e.g., cooking chamber volume of greater than 55 ft$^3$ but less than 75 ft$^3$, such as between 60 and 70 ft$^3$) and double (e.g., cooking chamber volume of greater than 90 ft$^3$, such as between 100 and 120 ft$^3$). A burner 16 is disposed in the chamber 14 and includes an associated flame protector 17, which in the illustrated embodiment circumscribes the burner 16. Operation of the burner may produce a BTU output corresponding to the size of the oven. For example, a micro size rack oven may produce BTUs below 50 thousand, such as between 35 and 45 thousand BTUs during cooking; a mini size rack oven may produce BTUs above 80 thousand but below 120 thousand, such as between about 85 and about 105 BTUs during cooking; a single size rack oven may produce BTUs above 150 thousand but below 220 thousand, such as between about 165 and about 195 thousand BTUs during cooking; and a double size rack oven may produce BTUs above 250 (e.g., above 300 thousand) but below 400 thousand, such as between about 330 and about 370 thousand BTUs during cooking.

In one embodiment, the burner 16 may include a pre-mixer (for mixing air, including oxygen, with gaseous fuel such as natural gas or propane) in combination with a mesh structure, with combustion taking place at the surface of the mesh. For example, a tubular mesh structure could be used, but other variations are possible, including infrared or other burner types.

A rack structure 18 is disposed within the cooking chamber 12 and includes multiple shelves for receiving multiple trays or pans of food product. A rack rotating structure 20 receives the rack and operates to rotate the rack structure and food product during cooking operations. In some rack ovens the rack is maintained within the oven at substantially all times (e.g., other than for repair or replacement), while in other rack ovens the rack can be rolled into and out of the oven for the purpose of loading and unloading food product. The cooking chamber is accessible via a door opening 23 (door itself not shown).

A wall 22 between the cooking chamber 12 and combustion chamber 14 includes one or more passages 24 that enable flow of gases from the cooking chamber 12, past the burner 16 and then back to the cooking chamber 12. A blower 26 moves the gases upward through the combustion chamber 14 and then laterally over the top of the chamber to one or more ducts 28 (e.g., with outlet slots 30) that extend downward along the chamber 12. For a typical rack oven, the blower may be sized to move gases at a volume flow rate according to oven size. For example, both a micro size rack oven and a mini size rack oven may produce an air flow of less than 1200 CFM during operation, such as between about 600 and about 950 CFM; a single size rack oven may produce an air flow of greater than 1500 but less than 3000 CFM, such as between about 2000 and about 2500 CFM, and a double size rack oven may produce an air flow of greater than 2000 CFM, such as between about 2500 and about 3000 CFM. In the case of any of such oven sizes, the blower is sized and configured to operate (e.g., under control of a controller 100 of the oven) at a speed that produces the particular flow rate.

In operation, when cooking food product, the rack structure 18, located external of chamber 12, is loaded with food product (e.g., multiple trays or pans). Once loaded, the rack structure with food product thereon is moved into the cooking chamber 12 and connected with the rack rotating mechanism 20. Gaseous fuel and oxygen are delivered to the burner 16 in a combustion zone 14A for combustion, while at the same time blower 26 is operated to move gases along a circulation flow path from the cooking chamber 12, past the burner 16 to pick-up heat and combustion gases (note that the combustion is exposed to the flow) and then back to the cooking chamber 12 to heat the cooking chamber and food product therein. The flame protector 17 is utilized in the circulation flow path so that gases moving past the burner 16 do not extinguish the burner. Gases are exhausted from the oven via an outlet opening 32 located in a lower portion of the cooking chamber 12, which leads to a vertical duct 34 that extends upward and is connected to deliver the gases to a vent hood 36, which may be connected to an exhaust path that leads out of the building in which the oven is housed. Primarily cooler gases from within the cooking chamber 12 are exhausted along this path due to the location of the outlet opening near the bottom of the chamber 12.

The described oven provides a direct fire arrangement in a rack oven, where the volume of air flow is substantial. By providing the flame protector 17, the oven enables such a direct fire arrangement so that the substantial airflow will not prevent the flame from igniting or pull the proven flame away from the burner and extinguish the flame. Thus, the flame protector acts as an air flow buffer for the burner. In the illustrated embodiment, the flame protector 17 has a tubular configuration (e.g., an expanded metal or perforated metal tube) and surrounds the burner. However, in other embodiments the flame protector need not surround the burner 16 entirely, though some portion of the flame protector structure 17 will need to be positioned upstream (relative to the direction of moving gases) of the burner 16.

The described oven arrangement would typically utilize a purge cycle before the burner is ignited. In order to eliminate the need for a complete purge of the oven cavity every cycle, a pilot flame may be maintained burning between cooking operations. The pilot flame may be positioned in the vicinity of the flame protector to also be protected from being extinguished.

It is to be clearly understood that the above description is intended by way of illustration and example only, is not intended to be taken by way of limitation, and that other changes and modifications are possible.

What is claimed is:

1. A method of cooking food product in a chamber of a rack oven, the method comprising:
rotating a rack structure with food product thereon within a cooking chamber of the oven;
delivering gaseous fuel and oxygen to a burner in a combustion zone;
moving gases along a circulation flow path from the cooking chamber past the burner to pick-up heat and combustion gases and then back to the cooking chamber to heat the cooking chamber and food product therein; and
utilizing a flame protector in the circulation flow path upstream of the burner such that gases moving past the burner do not extinguish the burner.

2. The method of claim 1, further including:
exhausting gases from the oven via an outlet opening located in a lower portion of the cooking chamber.

3. The method of claim 1 wherein:
a volume of the cooking chamber is between about 10 and about 15 ft$^3$;
the burner operates with a BTU output of between about 35 thousand and about 45 thousand BTUs during cooking; and
gases are circulated at a rate of between about 600 and about 950 CFM during cooking.

4. The method of claim 1 wherein:
a volume of the cooking chamber is between about 35 and about 45 ft$^3$;
the burner operates with a BTU output of between about 85 thousand and about 105 thousand BTUs during cooking; and
gases are circulated at a rate of between about 600 and about 950 CFM during cooking.

5. The method of claim 1 wherein:
a volume of the cooking chamber is between about 60 and about 70 ft$^3$;
the burner operates with a BTU output of between about 165 thousand and about 195 thousand BTUs during cooking; and
gases are circulated at a rate of between about 2000 and about 2500 CFM during cooking.

6. The method of claim 1 wherein:
a volume of the cooking chamber is between about 100 and about 120 ft$^3$;
the burner operates with a BTU output of between about 250 thousand and about 370 thousand BTUs during cooking; and
gases are circulated at a rate of between about 2500 and about 3000 CFM during cooking.

7. The method of claim 1 wherein the combustion zone is positioned alongside the cooking chamber.

8. The method of claim 1 wherein the flame protector comprises a perforated structure.

9. The method of claim 1 wherein the flame protector comprises an expanded metal cylinder within which the burner is positioned.

10. The method of claim 1 wherein the burner comprises a pre-mixer in combination with a mesh structure.

11. The method of claim 2 wherein in the exhausting step primarily cooler gases from within the cooking chamber are exhausted due to the location of the outlet opening.

12. A method of cooking food product in a chamber of a rack oven, the method comprising:
rotating a rack structure with food product thereon within a cooking chamber of the oven;
delivering gaseous fuel and oxygen to a burner in a combustion zone;
moving gases along a circulation flow path from the cooking chamber into the combustion zone and past the burner to pick-up heat and combustion gases and then from the combustion zone back to the cooking chamber to heat the cooking chamber and food product therein; and
utilizing a flame protector in the circulation flow path upstream of the burner such that gases moving past the burner do not extinguish the burner.

13. The method of claim 12, further including:
exhausting gases from the oven via an outlet opening located in a lower portion of the cooking chamber.

* * * * *